(12) United States Patent
Qiu et al.

(10) Patent No.: US 12,518,849 B2
(45) Date of Patent: Jan. 6, 2026

(54) TEST DEVICE, TEST METHOD, AND TEST MACHINE

(71) Applicant: YANGTZE MEMORY TECHNOLOGIES CO., LTD., Wuhan (CN)

(72) Inventors: Xiaofeng Qiu, Wuhan (CN); Xiao Tong, Wuhan (CN)

(73) Assignee: YANGTZE MEMORY TECHNOLOGIES CO., LTD., Wuhan (CN)

(*) Notice: Subject to any disclaimer, the term of this patent is extended or adjusted under 35 U.S.C. 154(b) by 376 days.

(21) Appl. No.: 18/090,970

(22) Filed: Dec. 29, 2022

(65) Prior Publication Data

US 2023/0215510 A1 Jul. 6, 2023

Related U.S. Application Data

(63) Continuation of application No. PCT/CN2021/142881, filed on Dec. 30, 2021.

(51) Int. Cl.
*G11C 29/56* (2006.01)
*G06F 11/22* (2006.01)

(52) U.S. Cl.
CPC .... *G11C 29/56016* (2013.01); *G06F 11/2221* (2013.01); *G11C 2029/5602* (2013.01)

(58) Field of Classification Search
CPC ...... G11C 29/56016; G11C 2029/5602; G06F 11/2221
USPC ... 324/500, 537, 600, 76.11, 750.03–750.11, 324/750.22–750.26, 757.1–758.1
See application file for complete search history.

(56) References Cited

U.S. PATENT DOCUMENTS

| | | | |
|---|---|---|---|
| 6,573,739 B1* | 6/2003 | Saito | G01R 1/0483 324/750.25 |
| 8,458,526 B2* | 6/2013 | Dalphy | G11B 20/1816 714/6.1 |
| 10,782,747 B2* | 9/2020 | Lin | G06F 1/20 |
| 10,816,593 B2* | 10/2020 | Chen | G01R 31/2834 |
| 2010/0235693 A1* | 9/2010 | Kang | G11C 29/56016 714/E11.159 |
| 2011/0176864 A1* | 7/2011 | Shin | G01R 1/0433 439/55 |
| 2015/0077923 A1* | 3/2015 | Rauline | G11B 33/126 361/679.33 |
| 2018/0321303 A1* | 11/2018 | Chen | G01R 31/01 |
| 2023/0060313 A1* | 3/2023 | Phan | G01R 31/2844 |

(Continued)

FOREIGN PATENT DOCUMENTS

| CN | 111930574 A | 11/2020 |
|---|---|---|
| CN | 212365508 U | 1/2021 |

(Continued)

*Primary Examiner* — Huy Q Phan
*Assistant Examiner* — Trung Q Nguyen
(74) *Attorney, Agent, or Firm* — BAYES PLLC (57) ABSTRACT

A test device includes a test plate and an adapter box. The rest plate includes a test port, and a first positioning portion disposed on the test plate. The adapter box includes a box body configured to detachably mount Solid State Drives to be tested, and a second positioning portion disposed on the box body and configured to cooperate with the first positioning portion to cause the Solid State Drives to be tested to form a communication connection with the test port.

20 Claims, 7 Drawing Sheets

(56) References Cited

U.S. PATENT DOCUMENTS

2023/0098635 A1* 3/2023 Yun .................... G01R 31/2844
324/754.03

FOREIGN PATENT DOCUMENTS

| CN | 113257334 A | 8/2021 |
| TW | I683316 B | 1/2020 |

* cited by examiner

TEST DEVICE, TEST METHOD, AND TEST MACHINE

CROSS-REFERENCE TO RELATED APPLICATIONS

This application is a continuation of International Application No. PCT/CN2021/142881, filed on Dec. 30, 2021, which is incorporated herein by reference in its entirety.

TECHNICAL FIELD

The present disclosure relates to the field of a test device, and more particularly, to a device used for testing, a test method, and a test machine.

BACKGROUND

With the rapid development of the Internet, people's demand for data information storage is also increasing. SSD (Solid State Drives), as a carrier for storing data information, has characteristics such as high storage speed and low power consumption, etc., and thus is widely applied in many fields such as vehicles, industrial control, video monitoring, network monitoring and so on.

SUMMARY

Implementations of the present disclosure provide a device used for testing. The test device includes a test plate including a test port, and a first positioning portion disposed on the test plate; and an adapter box including a box body for detachably mounting a plurality of SSDs to be tested, and a second positioning portion disposed on the box body and adapted to cooperate with the first positioning portion to cause the plurality of SSDs to be tested to form a communication connection with the test port.

In one implementation, the first positioning portion includes a slide groove, and the second positioning portion includes a slide rail for being slidably connected with the slide groove.

In one implementation, the slide rail includes at least two positioning fulcrums which are disposed along a mounting direction and a sliding direction of the slide rail and are slidably connected with the slide groove.

In one implementation, a locking assembly is further included. The locking assembly includes a pressure lever rotatably connected with the first positioning portion; a stop block disposed on the pressure lever to rotate with the pressure lever, wherein at least part of the stop block may be snap-fitted to a side of one positioning fulcrum facing away from the test plate.

In one implementation, the stop block includes a limiting groove extending in a rotation plane of the pressure lever, and the pressure lever is in a locked state or an avoidance state with respect to the first positioning portion; wherein a first end of the limiting groove is snap-fitted to the one positioning fulcrum to cause the plurality of SSDs to be tested to form a communication connection with the test port when the pressure lever is in the locked state; and a distance between a second end of the limiting groove and a rotation center of the pressure lever is greater than a distance between the first end and the rotation center, wherein the second end of the limiting groove pushes against the one positioning fulcrum such that the plurality of SSDs to be tested break the communication connection with the test port when the pressure lever is in the avoidance state.

In one implementation, the stop block is fixedly connected to the pressure lever.

In one implementation, the stop block is slidably connected with the first positioning portion and slidably connected with the pressure lever.

In one implementation, the adapter box further comprises a plurality of test adapter plates which are detachably mounted to the box body and are used for mounting the SSDs to be tested, wherein the test adapter plate includes: a circuit board; a first port adapted to form a communication connection with the SSDs to be tested; and a second port communicatively connected with the first port through the circuit board, and adapted to form a communication connection with the test port.

In one implementation, the test adapter plate further includes a buckle and at least one securing position that is disposed in a direction away from the first port, the buckle being adapted to be detachably fixed to one of the at least one securing position; a distance between the securing position and the first port is adapted to different specifications and models of the SSDs to be tested.

In one implementation, the first port is an M.2 slot, the second port is a U.2 golden finger, and the test port is a U.2 slot.

In one implementation, the adapter box further comprises a fool-proof structure including a first component located at the box body and a second component located at the test adapter plate, the first component being matched with the second component such that the box body is mounted to the test adapter plate in a predetermined direction.

In one implementation, the adapter box is disposed as a hollowed-out structure.

In one implementation, a processor connected with the test port is further included, the processor being configured to control scanning processing for the plurality of SSDs to be tested.

A second aspect of the present disclosure provides a test machine. The test machine includes a processor for being communicatively connected with the test port in the aforementioned test device; and a memory communicatively connected with the processor and storing computer-executable instructions which, when executed by the processor, scan the plurality of SSDs to be tested through the test port.

In one implementation, the computer-executable instructions are further executed by the processor to further implement a step of storing data of the plurality of SSDs to be tested obtained by the scanning as a data set.

In one implementation, the computer-executable instructions are further executed by the processor to further implement a step of determining whether the SSDs are qualified according to the data set.

In a third aspect, the implementation of the present disclosure provides a test method. The test method includes installing a plurality of SSDs to be tested using the aforementioned device; and scanning the plurality of SSDs to be tested.

In one implementation, the method further comprises storing data of the plurality of SSDs to be tested as a data set.

In one implementation, the method further comprises determining whether the SSDs are qualified according to the data set.

The device for testing the SSDs provided by the implementation of the present disclosure can realize that a plurality of SSDs can be plugged at one time, and the waiting time of the test machine is short. The device is utilized to test the SSDs, which saves time and labor and achieves high accuracy, not only saves labor costs, but also avoids wear of the golden finger of the SSD caused by repeated plugging and unplugging of the SSD with bare hands. In addition, the device has high compatibility and is suitable for SSDs of various specifications and models.

BRIEF DESCRIPTION OF THE DRAWINGS

Other features, objects, and advantages of the present disclosure will become more apparent upon reading the detailed description of non-limiting implementation made with reference to the following drawings.

DETAILED DESCRIPTION

For better understanding of the present disclosure, various aspects of the disclosure will be described in more detail with reference to the accompanying drawings. It should be understood that the detailed description is merely description of exemplary implementation of the present disclosure and is not intended to limit the scope of the present disclosure in any way. Throughout the specification, like reference numerals refer to like elements. The expression "and/or" includes any and all combinations of one or more of the associated listed items.

It should be noted that in this specification, the expressions such as first, second, third, and etc., are used only to distinguish one feature from another feature and do not represent any limitation on the feature. Accordingly, without departing from the teachings of the present disclosure, a first positioning portion discussed hereinafter may also be referred to as a second positioning portion, and a first port may also be referred to as a second port, and vice versa.

In the drawings, the thickness, size, and shape of the components have been slightly adjusted for ease of illustration. The drawings are merely exemplary and are not drawn strictly to scale. For example, the height of the adapter box and the length of the pressure lever are not according to proportion in actual production. As used herein, the terms "substantially," "about," and the like are used as terms for approximation, not as terms for degree, and are intended to illustrate inherent deviations in measured or calculated values as will be appreciated by those ordinarily skilled in the art.

It is also to be understood that the terms "comprising," "comprise," "having," "containing," and/or "contain," when used in this specification, denote the presence of the stated features, elements and/or components, but do not preclude the presence or addition of one or more other features, elements, components and/or combinations thereof. Furthermore, when an expression such as "at least one of . . . " appears before the list of listed features, the expression modifies the entire list of features rather than an individual element in the list. Furthermore, when describing implementations of the present disclosure, the use of "may" means "one or more implementations of the present disclosure." Also, the term "exemplary" is intended to refer to an example or illustration.

Unless otherwise defined, all wordings (including engineering terms and technical terms) used herein have the same meaning as that are commonly understood by those ordinarily skilled in the art to which the present disclosure pertains. It should also be understood that unless explicitly stated in the present disclosure, words defined in a common dictionary should be interpreted as having meanings consistent with their meanings in the context of the related art, and should not be interpreted in an idealized or overly formal sense.

It should be noted that the implementations and the features in the implementations in the present disclosure can be combined with each other without conflict. In addition, unless explicitly defined or contradictory to the context, the specific steps included in the method recited in the present disclosure are not necessarily limited to the recited order, but may be executed in any order or in parallel. Hereinafter, the present disclosure will be described in detail with reference to the drawings and in connection with the implementations.

The test machine comprises a plurality of test interfaces onto which the SSDs are plugged before testing. After plugging the SSDs onto all of the test interfaces, the test is started. In the process of completing the functional tests, the SSDs must be unplugged and plugged, powered on, and powered off multiple times. Furthermore, after the test is finished, the SSDs are pulled out one by one. Because of the overly long time taken for unplugging and plugging, the test machine is in a standby state most of the time, and the idle waiting time is long. The utilization rate of the test machine is low, and the test efficiency is low. In addition, for testing the SSDs with different interfaces, corresponding test plates need to be configured. That is, the test system has low compatibility. In addition, the accuracy of manual plugging and unplugging is not high, and manual plugging and unplugging many times easily cause wear of the SSD gold finger.

Figure 1:
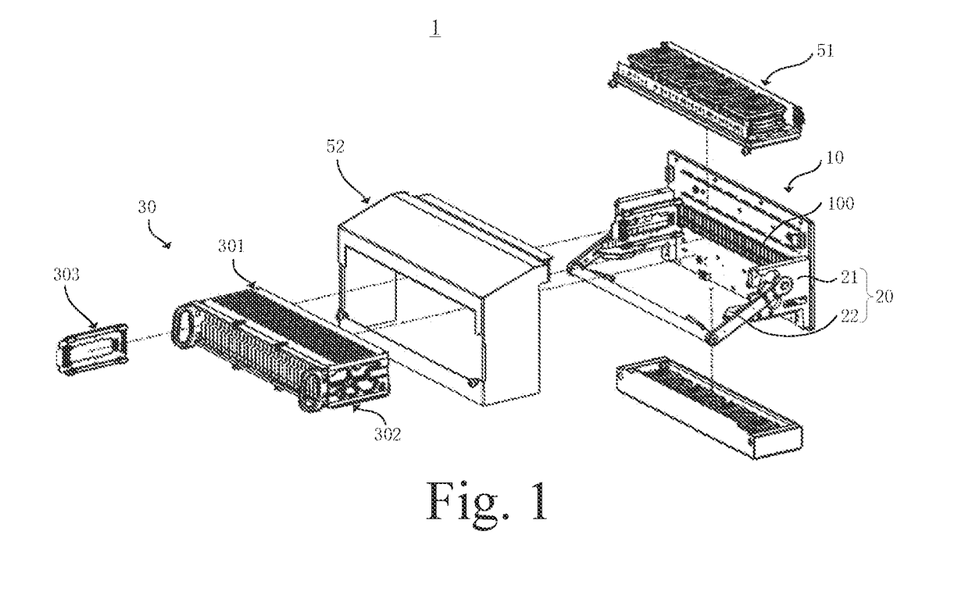
FIG. 1 is a schematic exploded view of a test device according to an implementation of the present disclosure.

FIG. 1 is a schematic exploded view of a device for testing the SSDs according to an implementation of the present disclosure.

Referring to FIG. 1, a test device 1 provided by an implementation of the present disclosure comprises a test plate 10, a first positioning portion 20, and an adapter box 30.

The test plate 10 may include, for example, a printed circuit board (PCB), and further include a substrate and conductive lines (not fully shown) disposed within the substrate. The test plate 10 may be assembled with the machine, for testing and data processing, etc., of the SSDs to be tested. The test plate 10 may include a test port 100 through which the test plate 10 is communicatively connected with the SSD to be tested, and in an exemplary implementation, the test port 100 may be a U.2 slot.

Figure 2:
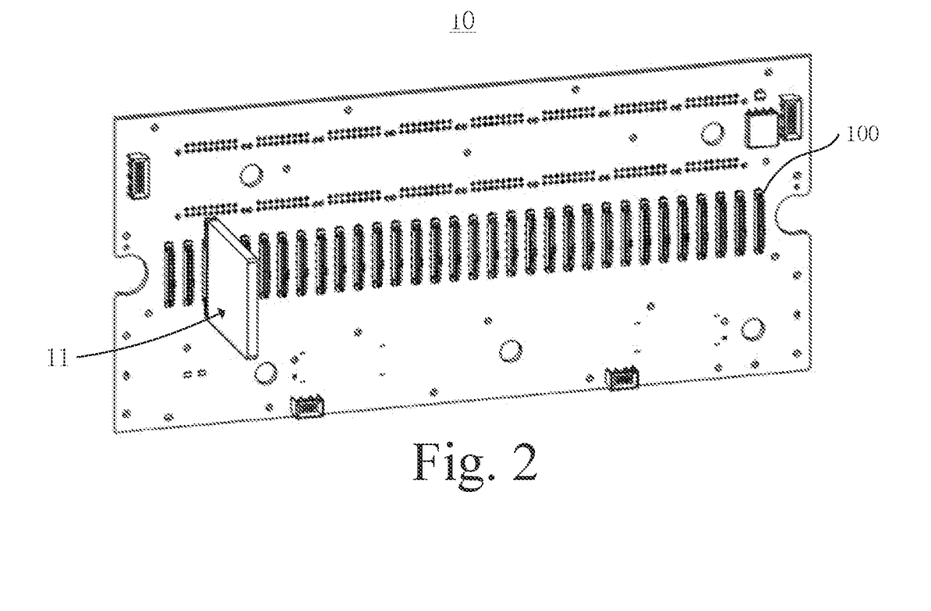
FIG. 2 is a schematic structural diagram of a test plate according to an implementation of the present disclosure.

Referring to FIG. 2, for example, thirty-two test ports 100 may be disposed on the test plate 10, and one SSD 11 to be tested may be plugged into each test port 100. The test ports 100 may be arranged in a row, and the test ports 100 are arranged in the same direction. Sufficient space remains between adjacent test ports 100. The test plate 10 may be arranged in different ways during use, for example, with the test ports 100 facing upward, or with the test ports 100 facing horizontally.

Returning to FIG. 1, the first positioning portion 20 may be connected with the test plate 10, and for example, the first positioning portion 20 may be detachably connected with the test plate 10. The first positioning portion 20 is mainly used for accurately assembling and positioning the adapter box 30 with the test plate 10. Specifically, the first positioning portion 20 serves as a positioning reference for the adapter box 30 and may be used to define a mounting direction of the adapter box 30, and the first positioning portion 20 may be at a determined position relative to the test port 100.

The adapter box 30 includes a box body 301 and a second positioning portion 302. The box body 301 is used to detachably mount a plurality of SSDs to be tested. Specifically, the box body 301 may include a plurality of mounting locations, such as thirty-two mounting locations. The thirty-two mounting locations are arranged in the same manner as the test ports 100, and thus each mounting location can be used to mount one SSD to be tested. For one device, one test plate 10 can be equipped with a plurality of adapter boxes 30.

The second positioning portion 302 may be disposed on the box body 301 and has a determined position relative to the mounting position. The first positioning portion 20 may include a baffle plate 21 and a supporting plate 22. The baffle plate 21 serves to define a position of the adapter box 30 relative to the test plate 10 in the horizontal direction, that is, a position of the mounting position relative to the test port 100 in the horizontal direction. As an example, the supporting plate 22 may define a position of the adapter box 30 relative to the test plate 10 in a vertical direction.

Figure 3:
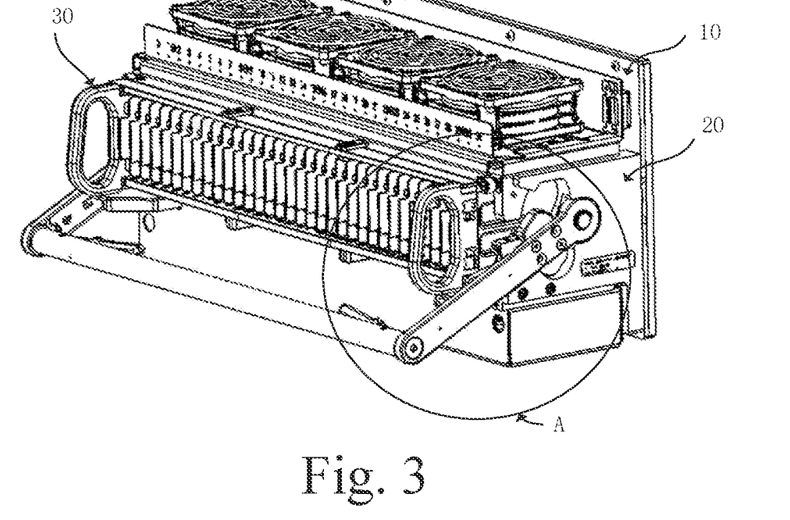
FIG. 3 is a schematic structural diagram of a test device according to an implementation of the present disclosure.
Figure 4:
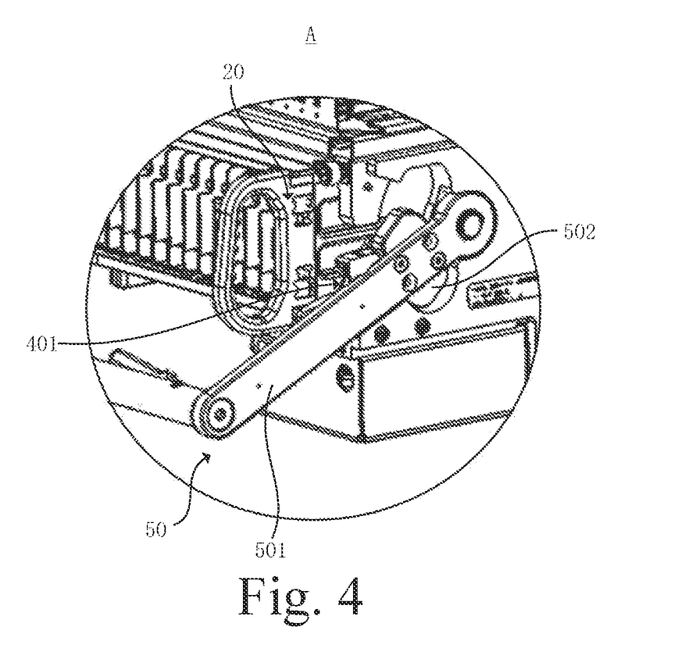
FIG. 4 is an enlarged view of part A in FIG. 3.
Figure 5:
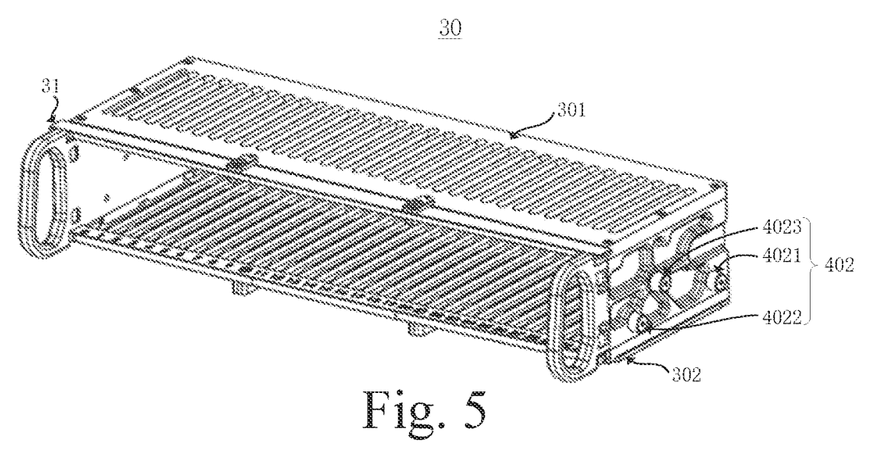
FIG. 5 is a schematic structural diagram of a box body according to an implementation of the present disclosure.

Referring to FIGS. 3 to 5, in some implementations, the first positioning portion 20 includes a slide groove 401, and the second positioning portion 302 includes a slide rail 402. In some implementations, the first positioning portion includes a slide rail, and the second positioning portion includes a slide groove. The first positioning portion 20 and the second positioning portion 302 may also cooperate in other ways, such that the box body 301 is matched with the test plate 10 in a predetermined mounting direction, and each mounting position of the box body 301 is aligned with one test port 100. As an example, the test device 1 may include at least one of the supporting plate 22 and the slide rail 402.

When the SSD to be tested is mounted in the box body 301, a plurality of SSDs to be tested are mounted into a plurality of test ports in the mounting direction in synchronization with the movement of the box body 301. The second positioning portion 302 and the first positioning portion 20 cooperate with each other to communicatively connect the plurality of SSDs to be tested with the plurality of test ports 100 in a one-to-one correspondence.

As an example, the test device 1 may also include a fan 51 and a housing 52. The fan 51 is disposed at a side of the test port 100, for cooling the SSD under test. The housing 52 covers the test plate 10 to protect the test plate 10.

An an example, the test device 1 further comprises a processor (not shown). The processor is communicatively connected with the test plate 10, for testing the SSDs to be tested.

When an operator performs a test using the test device 1 provided by the present disclosure, for example, thirty-two SSDs to be tested may be first mounted in the box body 301, and then by the cooperation of the first positioning portion 20 and the second positioning portion 302, the thirty-two SSDs to be tested are synchronously plugged into the thirty-two test ports 100 in one-to-one correspondence. As an example, the test device 1 may scan all of the SSDs to be tested to obtain a set of related data at one time. When the test device 1 tests these thirty-two installed SSDs, the operator can install the SSDs to be tested into the box body of another adapter box.

After the test device 1 tests these thirty-two installed SSDs, the operator can pull out the adapter box 30 mounted on the test plate 10, and then these thirty-two already-tested SSDs are pulled out synchronously. The operator can then mount another adapter box to the test plate 10, and additional thirty-two SSDs to be tested are synchronously plugged into the thirty-two test ports in one-to-one correspondence.

The data in Table 1 is calculated based on the machine of the exemplary implementation, and there are totally four rows of test ports connected with the machine, thirty-two in each row.

TABLE

| | Productivity comparison | | | | |
|---|---|---|---|---|---|
| Mode | Test station type | Pure test time (min) | On-line plugging and unplugging time (min) | Single-layer Cycle time (min) | Whole-machine Cycle time (min) | Production per hour |
| Single-chip mode | FT | ~5 | ~10 | ~15 | ~40 | 192 |
| Batch mode | FT | ~5 | ~1 | ~6 | ~8 | 960 |

Table 1 shows the respective operating time and productivity of the single-chip mode and the batch mode provided by the present disclosure, and in particular, the test station type may be Functional Tester (FT).

"Pure test time" represents the time in which the test program is running. As shown in Table 1, the pure test time for the normal running program to detect a plurality of SSDs, such as thirty-two SSDs, is 5 minutes.

"On-line plugging and unplugging time" represents the time occupied by the unplugging and plugging operation that the test program cannot run and must wait. As shown in Table 1, in the single-chip mode, it takes up to 10 minutes to unplug thirty-two SSDs in each row and plug thirty-two new SSDs. In the batch mode of the present disclosure, thirty-two SSDs can be unplugged and plugged at one time using the adapter box, and the on-line unplugging and plugging time is 1 minute.

"Single-layer Cycle time" represents the time spent on each batch of SSDs when a row of test ports on the machine test one batch of SSDs after another. The time elapsed from the start of testing of a batch of, for example, thirty-two SSDs to the complete end thereof to be able to start testing the next batch of SSDs is equal to the pure test time plus the on-line unplugging and plugging time. As shown in Table 1, the single-layer Cycle time is 15 minutes in the single-chip mode. In the batch mode, the single-layer Cycle time is 6 minutes.

"Whole-machine Cycle time" represents the time elapsed from the start of testing of 128 SSDs to the end thereof by the four rows of test ports of the exemplary machine to be able to start testing of the next set of 128 SSDs. As shown in Table 1, in the single-chip mode, when operating the machine, it also takes 10 minutes to plug a row of SSDs to be tested and then unplug a row of SSDs that have been tested. Since the pure test time is shorter than the on-line unplugging and plugging time, in the four-row cycle, testing of the previous row has been completed in the process of unplugging and plugging, and the cycle time of the complete machine is 40 minutes. In the batch mode, when the whole machine operates cyclically, it needs to wait for the completion of running the test program after the three rows of SSDs are unplugged and plugged, and the whole-machine Cycle time is 8 minutes.

"Production per hour" refers to the number of SSDs that can be produced per hour while the machine continues to work. As shown in Table 1, in the single-chip mode, 128 pieces are tested every 40 minutes, and then the test machine produces 192 pieces of tested SSDs per hour. In the batch mode of the present disclosure, 128 pieces can be tested every 8 minutes, and then the test machine produces 960 pieces of tested SSDs per hour.

Specifically, when using the test device of the present disclosure, a plurality of more than four adapter boxes 30 may be prepared, and personnel may be deployed. When the SSD mounted on the test plate 10 is tested, the SSD to be tested is synchronously installed into the redundant adapter box 30, so as to ensure that the machine operates cyclically.

As can be seen from the above comparison in Table 1, a plurality of SSDs are synchronously unplugged and plugged, and a plurality of adapter boxes are disposed, and the operation of plugging the adapter boxes can be performed in parallel, reducing the waiting time of the test device 1, such that the on-line unplugging and plugging time is very short, and a larger percentage of overall time is spent in running the program purely for testing. During batch testing, the cycle use time of the device and the average man-hours consumed by each SSD are greatly reduced, and the number of the SSDs tested per hour is greatly increased.

Due to the limited area of the test plate, the distance between the plurality of test ports is relatively close, and the bonding force between the test ports and the SSDs is relatively large, for example, up to 20N. Unplugging and plugging a single SSD with a large force is prone to collision, which in turn may result in damage.

The present disclosure provides a device for testing the SSDs, in which a peripheral structure of a plurality of SSDs can be fixed relatively easily using an adapter box, compared to manually unplugging a single SSD, such that the relative positions between the plurality of SSDs are stable. When the SSDs are plugged into a test plate or when the SSDs are unplugged from the test plate, the SSDs are restrained from each other by the adapter box so that no collision occurs. The relationship between the adapter box and the test plate is limited by the first positioning portion and the second positioning portion, such that the operator can stably operate the adapter box, and then indirectly operate the gold finger of the SSD to be unplugged from and plugged relative to the test port of the test plate. Furthermore, since the adapter box restricts the peripheral structure of the SSD, compared to manually unplugging a single SSD, it is also easier to take the SSD out of the adapter box.

Furthermore, the device for testing the SSDs provided by the present disclosure can stably plug the SSDs to be tested into the test plate, thereby avoiding the phenomenon that unplugging and plugging have to be repeated due to plugging deviation. This in turn reduces the wear on the test port and also reduces to some extent the wear on the golden fingers of the SSDs, and also reduces the probability of debris remaining in the test port. Thus, the test port of the test plate has a long service life.

In an exemplary implementation, the device for testing the SSDs provided by the present disclosure may be communicatively connected with an upper computer. The upper computer can be used to run the manufacturing execution system (MES).

As an example, the processor may perform the following steps. Communicative connection with the manufacturing execution system is established by an MES interface. Data of a plurality of SSDs is stored as a data set, and the data set is processed.

Figure 6:
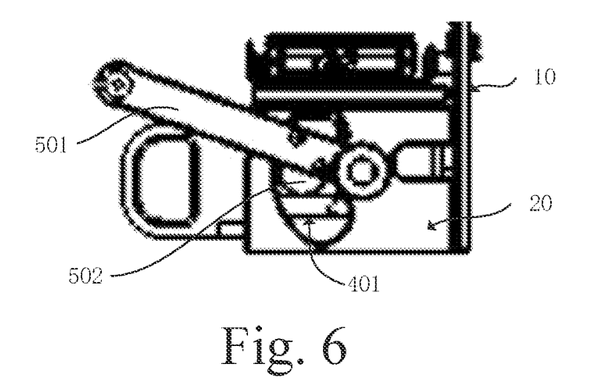
FIG. 6 is a side view of a test device according to an implementation of the present disclosure.

Referring to FIGS. 4 to 6, in an exemplary implementation, the first positioning portion 20 may include a slide groove 401, and the second positioning portion 302 may include a slide rail 402. The slide rail 402 may be slidably connected with the slide groove 401.

An an example, two baffle plates 21 of the second positioning portion 302 are disposed at two sides of the adapter box 30, at least one slide rail 402 is disposed on the second positioning portion 302, and the positions of the slide rail 402 and the slide groove 401 match, and the slide rail 402 moves on the slide groove 401 in the direction in which the adapter box 30 is mounted and detached.

Referring to FIG. 5, specifically, positioning fulcrums 4021 to 4023 are included in the slide rail 402. When the test device 1 includes the supporting plate 22, at least one positioning fulcrum 4021/4022/4023 may be included, and for example, the third positioning fulcrum 4023 may be combined with a locking assembly 50 for locking the slide rail 402 and the slide groove 401 in the mounting direction, so as to prevent the adapter box 30 from falling off from the test adapter plate 303, thereby ensuring that the SSD to be tested is always connected with the test port 100 in a good and stable manner during testing. When the test device 1 does not include a supporting plate, at least two positioning fulcrums 4021/4022/4023 may be included as guide rails 402 and are used for positioning.

Referring to FIGS. 6 and 4, specifically, the test device 1 provided by the implementation of the present disclosure includes a locking assembly 50, and the locking assembly 50 includes a pressure lever 501 and a stop block 502. The pressure lever 501 is rotatably connected with the first positioning portion 20 to switch between a locked state and an avoidance state. An an example, FIG. 6 shows a schematic structure when the pressure lever 501 is in the avoidance state. The stop block 502 is disposed on the pressure lever 501 to rotate with the pressure lever 501, wherein at least a part of the stop block 502 may be snap-fitted to a side of one positioning fulcrum 4021/4022/4023 facing away from the test plate 10.

Figure 7:
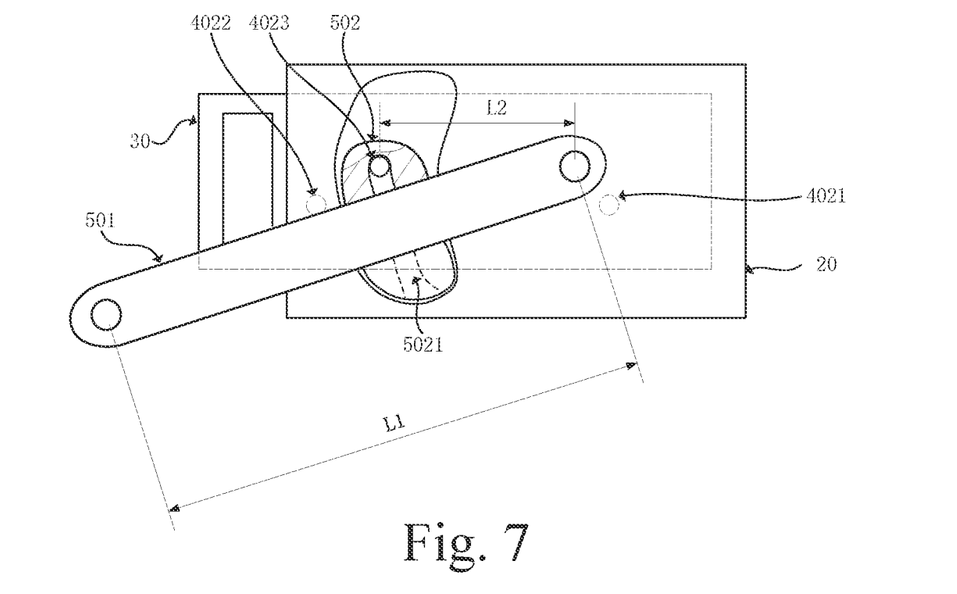
FIG. 7 is a schematic principle diagram of a test device according to an implementation of the present disclosure.

The stop block 502 includes a limiting groove 5021 extending in a rotation plane of the pressure lever 501, wherein when the pressure lever 501 is in the locked state as shown in FIG. 7, an upper end (i.e., first end) of the limiting groove 5021 is snap-fitted to the third positioning fulcrum 4023, such that the SSD to be tested is plugged into the test port 100 at the predetermined position to ensure forming the communication connection. As an example, the distance between a lower end (i.e., second end) of the limiting groove 5021 and a rotation center of the pressure lever 501 is greater than the distance between an upper end and the rotation center, and when the pressure lever 501 is in the avoidance state, the lower end of the limiting groove 5021 may push against the third positioning fulcrum 4023 to unplug the SSD to be tested out of the test port 100 to break the communication connection between the SSD to be tested and the test port 100.

Referring to FIG. 7, when the pressure lever 501 is moved from the top to the bottom, that is, is changed from the avoidance state to the locked state, a first moment arm that the operator presses the pressure lever 501 is L1, and a second moment arm of the reaction force of the third positioning fulcrum 4023 to the stop block 502 is L2. By disposing the first moment arm L1, the second moment arm L2, and a groove type of the limiting groove 5021, a component force of the reaction force in the mounting direction can be controlled, which ensures that each SSD to be tested is plugged into the test port 100 under less pressure. When unplugging a single SSD, the operator's fingers are required to exert a greater force, and thus there is a potential risk of causing pain or injury to the fingers, and in contrast, when the operator uses the device of the present disclosure, the pressure applied by pressing the pressure lever 501 is small, and in particular, the contact area is large and thus the intensity of pressure applied to the fingers is small, thereby serving to protect the operator's fingers to some extent.

In the exemplary implementation, the stop block 502 is fixedly connected with the pressure lever 501. In some other implementations, the stop block is slidably connected with the first positioning portion and slidably connected with the pressure lever.

Figure 8:
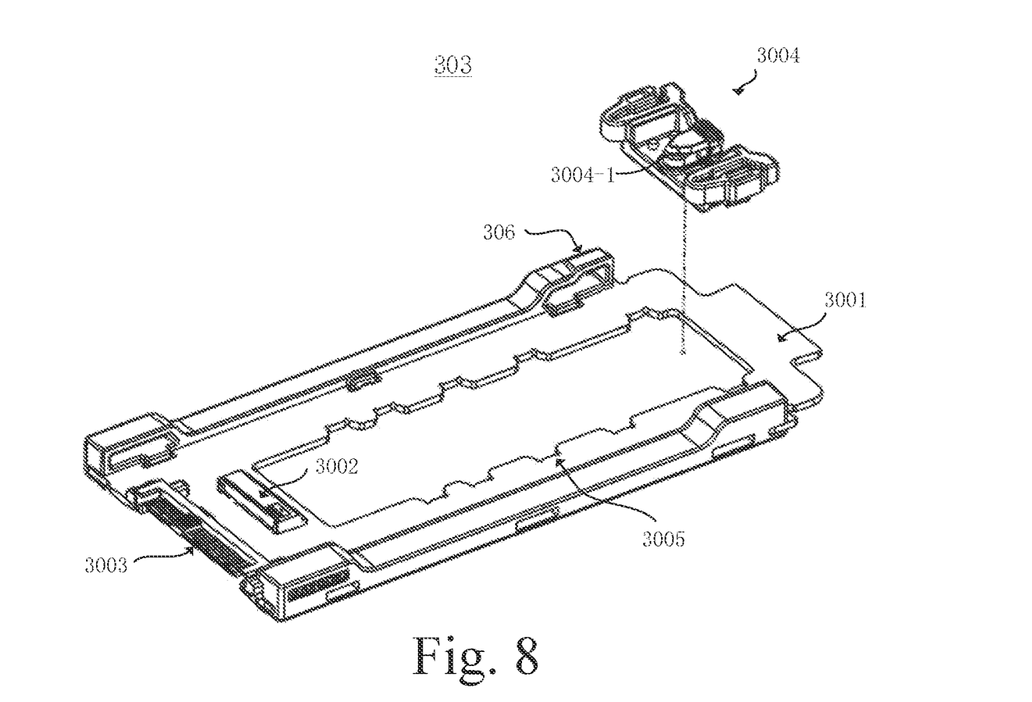
FIG. 8 is a schematic structural diagram of a test adapter plate according to an implementation of the present disclosure.

Referring to FIG. 8, in an exemplary implementation, the adapter box 30 further includes a plurality of test adapter plates 303, each of which is used to be mounted to one mounting location of the box body 301. The test adapter plate 303 may include a circuit board 3001, a first port 3002, and a second port 3003. The second port 3003 is communicatively connected with the first port 3002 through the circuit board 3001.

In actual operation, the SSD to be tested is firstly disposed on the test adapter plate 303, such that the first port 3002 is communicatively connected with the SSD to be tested. The SSD to be tested is then assembled to the adapter box 30 by using the test adapter plate 303. The second ports 3003 of the plurality of test adapter plates 303 are plugged in synchronism with the test port 100 of the test plate 10 to realize communication connection. Furthermore, the communication connection between the plurality of SSDs to be tested and the test plate 10 is realized.

The test adapter plate 303 further includes a buckle 3004 and at least one securing position 3005, and for example, the buckle 3004 is adapted to be detachably fixed to the at least one securing position 3005. Specifically, a plurality of securing positions 3005 are disposed on the circuit board 3001 in a direction away from the first port 3002, and the distance between the securing positions 3005 and the first port 3002 is adapted to the SSDs to be tested with different adapter sizes. For example, the SSDs include M.2 interfaces, that is, the golden fingers of the SSDs are M.2 interfaces, and the SSDs with the M.2 interfaces include five specifications, namely 2230, 2242, 2260, 2280, and 22120, for example.

The lengths of these five specifications of SSDs are 30 mm, 42 mm, 60 mm, 80 mm, and 110 mm, respectively. The distance between the five securing positions 3005 and the first port 3002 can be set according to the lengths of the five specifications. Although the lengths of five specifications of SSDs are described herein by way of example, those skilled in the art will appreciate that these descriptions are illustrative and not limiting.

In an exemplary implementation, the golden finger on the SSD may be an M.2 interface, and the first port 3002 is an M.2 slot. The M.2 interface of the SSD to be tested is plugged into the M.2 slot of the test adapter plate 303, and the other end of the SSD to be tested is fixed with the buckle 3004, and specifically, the buckle 3004 is disposed on a suitable securing position 3005 according to the length of the SSD to be tested.

The securing position 3005 includes two notches in a direction perpendicular to the unplugging and plugging direction of the SSD. The buckle 3004 includes two claws disposed opposite to each other, and the buckle 3004 is positioned at the securing position 3005 when the claws match with the notches. A positioning end 3004-1 of the buckle 3004 is used to push against the tail portion of the SSD to be tested, so as to ensure that the gold finger of the SSD to be tested is stably plugged into the first port 3002.

In an exemplary implementation, the second port 3003 may be a U.2 golden finger, and accordingly, the test port 100 may be a U.2 slot. That is, the communication connection between the second port 3003, and the test port 100 is realized.

Figure 9:
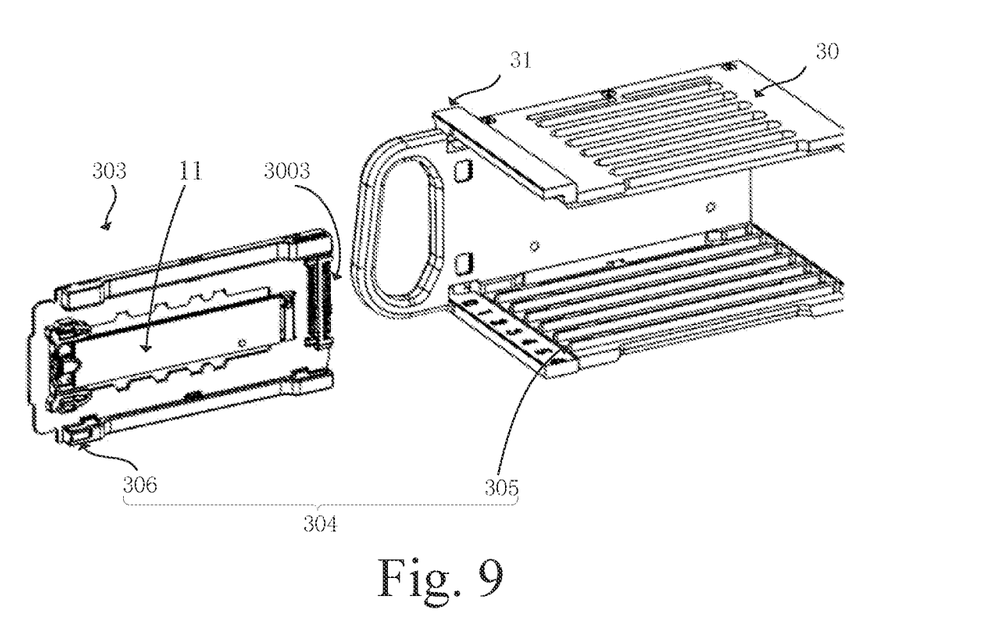
FIG. 9 is a schematic cross-sectional view of an adapter box according to an implementation of the present disclosure.
Figure 10:
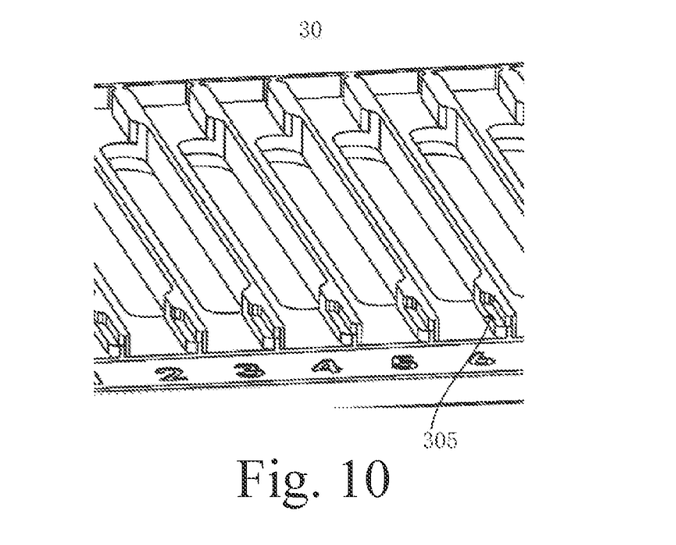
FIG. 10 is a schematic cross-sectional view of a box body according to an implementation of the present disclosure.

Referring to FIGS. 8 and 9, in an exemplary implementation, the adapter box 30 further includes a fool-proof structure 304 including a first component 305 located at the box body 301 and a second component 306 located at the test adapter plate 303. As shown in FIGS. 9 and 10, the first component 305 may illustratively be a groove, and the second component 306 may illustratively be a protrusion.

The first component 305 is matched with the second component 306 such that the box body is mounted to the first component 305 and the second component 306 of the test adapter plate in a predetermined direction, to ensure that the test adapter plate 303 is placed into the adapter box 30 in accordance with a predetermined correct posture, and then ensure that the golden fingers of the plurality of SSDs to be tested are arranged in a predetermined manner, that is, in the same arrangement manner as that of the plurality of test ports 100.

As an example, the box body 301 includes a plurality of slots, the cross-sectional boundaries of which are generally rectangular. If there is no fool-proof structure, the test adapter plate may be reversely plugged into the slot, and the SSD to be tested and the test port may be reversely plugged. As an example, the first component 305 may be a convex structure or a groove structure disposed at one side of the opening of each slot, and the second component 306 may be a groove structure or a convex structure disposed on the test adapter plate 303 and corresponding to the first component 305. When the test adapter plate 303 is placed into the slot in a correct posture, the first component 305 and the second component 306 are just engaged together, and when the test adapter plate 303 is placed into the slot in a wrong posture, the first component 305 and the second component 306 are misaligned, which will result in the test adapter plate 303 not being plugged into the slot and the operator not being able to perform the next operation. The fool-proof design allows the operator, accurately without error, to place the test adapter plate 303 on which the SSD to be tested is installed into the adapter box 30 without paying attention, so as to prevent the phenomenon that the operator who is careless or anxious hastily plugs the SSD to be tested reversely.

Referring to FIG. 9 and further to FIG. 5, the adapter box 30 further includes a locking lever 31. As an example, the locking lever 31 is disposed laterally outside the slot and is movable relative to the box body 301. FIG. 9 shows the state in which the locking lever 31 is opened, in which the test adapter plate 303 can be plugged into the slot. After the test adapter plate 303 is installed into the slot, the locking lever 31 moves into a locked state, as shown in FIG. 5, and can lock the tail portion of the test adapter plate 303, to prevent the test adapter plate 303 from falling off from the box body 301.

In the existing SSDs testing technology, it is necessary to manually plug the SSDs one by one into ports of test apparatuses, and generally, the stress of plugging and unplugging one SSD is about 20N.

The device for testing the SSDs provided by the implementation of the present disclosure is beneficial to reducing the weight of the adapter box by disposing the adapter box in a hollowed-out structure. As an example, in the case of ensuring the mechanical strength of the adapter box, the adapter box is disposed in the hollowed-out structure, such that the weight of the adapter box is below 3 kg. Then it is achievable that the total mass of the adapter box with thirty-two SSDs installed is within 4 kg. In addition, when thirty-two SSDs are simultaneously plugged into the test machine by using the locking assembly 50 at one time, the lever principle that the locking assembly 50 satisfies enables the stress to be controlled within 20N. The above is only an illustrative description, and the number of the SSDs that can be installed in actual use is not limited to thirty-two, and more test ports can be designed as needed.

Figure 11:
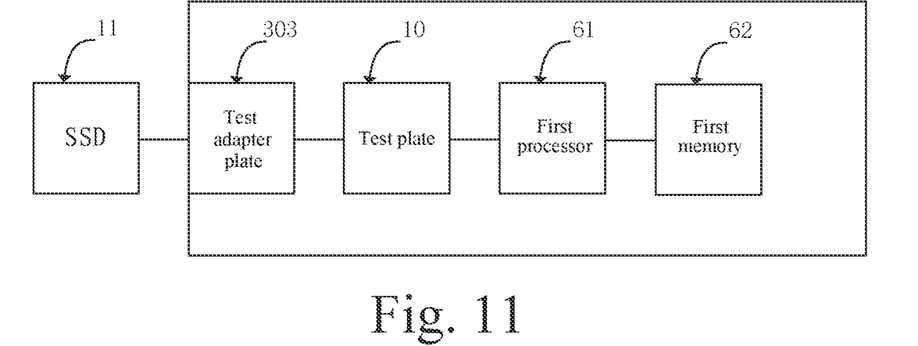
FIG. 11 is a block diagram of connection between a test device and an SSD to be tested according to an implementation of the present disclosure.

FIG. 11 is a block diagram of connection between a test device and an SSD to be tested according to an implementation of the present disclosure. As shown in FIG. 11, the test device 1 according to the implementation of the present disclosure may further include a test adapter plate 303, a test plate 10, a first processor 61, and a first memory 62. The SSD 11 to be tested is communicatively connected with the test adapter plate 303, so that the SSD 11 to be tested realizes communication connection with the first memory 62 through the test adapter plate 303 and the test plate 10. The first processor 61 controls the scanning processing of the SSD 11 to be tested, and may store the obtained data in the first memory 62.

Figure 12:
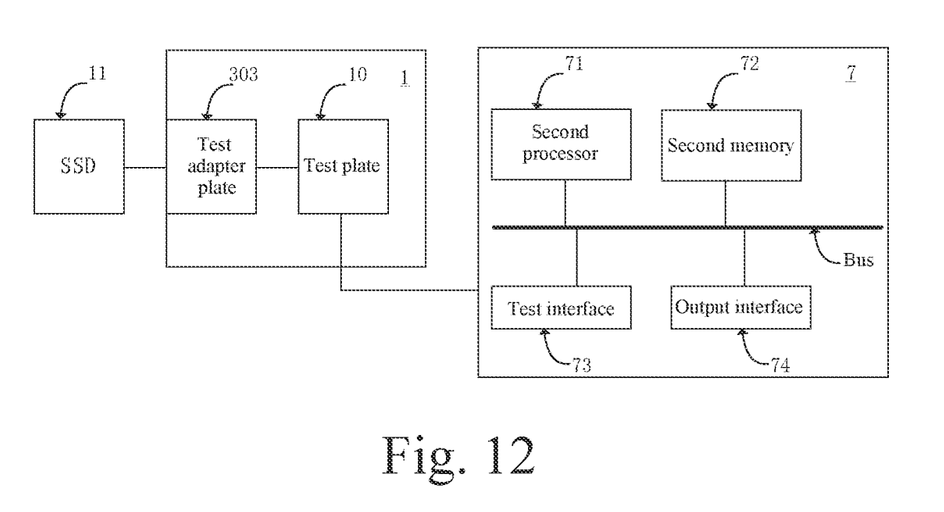
FIG. 12 is a schematic structural block diagram of connection between a test machine and a test device according to an implementation of the present disclosure.

FIG. 12 illustrates a test machine 7 provided according to an implementation of the present disclosure. The test machine 7 may include a second processor 71, a second memory 72, a test interface 73, an output interface 74, and interfaces for connecting various components, including a high speed interface and a low speed interface. Various components may be connected with each other by using different buses, and can be installed on a common motherboard or installed in other ways as required.

The test machine 7 may be communicatively connected with the test plate 10 of the test device 1 through the test interface 73, thereby realizing communication connection between the second processor 71 and the SSD 11 to be tested.

The second memory 72 may be a non-transitory computer readable storage medium. The second memory 72 stores computer readable instructions executable by at least one second processor 71 to cause the at least one second processor 71 to perform the test method provided by the present disclosure. The second memory 72 may also be used to store data obtained or generated by the second processor 71. The test machine 7 may be communicatively connected with an external system via an output interface 74 so that the test machine 7 may transmit data, such as test results.

Figure 13:
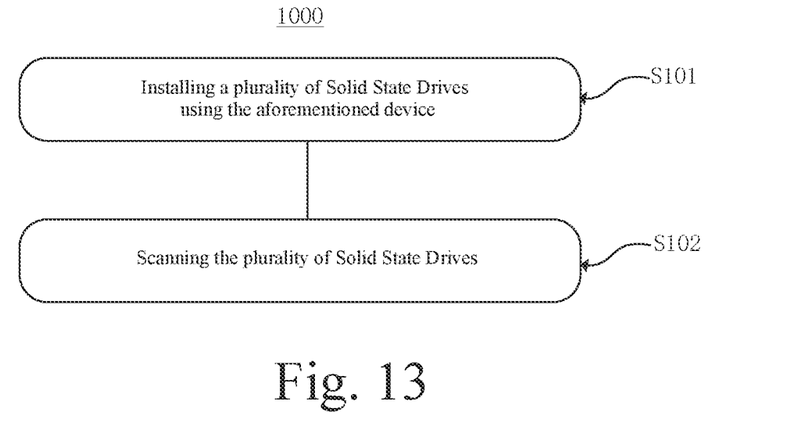
FIG. 13 is a flow block diagram of a method for testing an SSD according to an implementation of the present disclosure.

FIG. 13 illustrates a test method provided by an implementation of the present disclosure. The test method 1000 comprises the following steps: step S101: installing a plurality of SSDs using the aforementioned device; and step S102: scanning the plurality of SSDs. This method consumes less time and has high detection efficiency per unit of time.

In an implementation, the test method further comprises storing data of the plurality of SSDs as a data set. For mass-produced SSDs, a plurality of data sets can be obtained after the test method is executed many times. As an example, the test method can process the data sets. Specifically, the data sets may be uploaded to the manufacturing execution system (MES) to enable tracking of the product life cycle; and test results may be obtained according to the data sets, for example, whether various indexes of the SSD are qualified can be determined, and the unqualified SSD can be distinguished.

The foregoing description is only a relatively good implementation of the present disclosure and is merely illustrative of the technical principles employed. It should be understood by those skilled in the art that the scope of protection involved in the present disclosure is not limited to the technical solution resulting from a particular combination of the above technical features, but should also cover other technical solutions formed by any combination of the above technical features or equivalent features thereof without departing from the technical concept, such as the technical solutions formed by replacing the above-mentioned features with the technical features of the present disclosure (but not limited to) having similar functions.

What is claimed is:

1. A test device, comprising:
a test plate, comprising:
a test port; and
a first positioning portion disposed on the test plate; and
an adapter box, comprising:
a box body comprising mounting grooves configured to detachably mount multiple Solid State Drives to be tested along the mounting grooves; and
a second positioning portion disposed on and connected to the box body,
wherein:
the first positioning portion is configured to receive the second positioning portion, which is separate from the first positioning portion, to combine the adapter box that carries the multiple Solid State Drives to be tested with the test plate; and
a relative position between the test port and the box body is adjusted by engagement of the first positioning portion with a locking assembly rotatably connected with the first positioning portion, to cause the multiple Solid State Drives to be tested in the box body to form a communication connection with the test port.

2. The test device of claim 1, wherein
the first positioning portion includes a slide groove; and
the second positioning portion includes a slide rail for being slidably connected with the slide groove.

3. The test device of claim 2, wherein the slide rail includes positioning fulcrums that are disposed along a sliding direction of the slide rail and are slidably connected with the slide groove.

4. The test device of claim 3, further comprising the locking assembly, comprising:
- a pressure lever rotatably connected with the first positioning portion; and
- a stop block disposed on the pressure lever to rotate with the pressure lever, wherein at least part of the stop block is configured to be snap-fitted to a side of one of the positioning fulcrums facing away from the test plate.

5. The test device of claim 4, wherein
the stop block comprises a limiting groove extending in a rotation plane of the pressure lever;
the pressure lever is in a locked state or an avoidance state with respect to the first positioning portion;
a first end of the limiting groove is snap-fitted to the one of the positioning fulcrums to cause the multiple Solid State Drives to be tested to form a communication connection with the test port when the pressure lever is in the locked state;
a distance between a second end of the limiting groove and a rotation center of the pressure lever is greater than a distance between the first end and the rotation center; and
the second end of the limiting groove pushes against the one of the positioning fulcrums, and the multiple Solid State Drives to be tested break the communication connection with the test port when the pressure lever is in the avoidance state.

6. The test device of claim 4, wherein the stop block is fixedly connected with the pressure lever.

7. The test device of claim 4, wherein the stop block is slidably connected with the first positioning portion and slidably connected with the pressure lever.

8. The test device of claim 1, wherein
the adapter box further comprises test adapter plates that are detachably mounted to the box body and are configured to mount the multiple Solid State Drives to be tested; and
one of the test adapter plates comprises:
- a circuit board;
- a first port configured to form a communication connection with the multiple Solid State Drives to be tested; and
- a second port communicatively connected with the first port through the circuit board and configured to form a communication connection with the test port.

9. The test device of claim 8, wherein
one of the test adapter plates further comprises a buckle and at least one securing position that is disposed in a direction away from the first port, the buckle being adapted to be detachably fixed to one of the at least one securing position; and
a distance between the securing position and the first port is adapted to the multiple Solid State Drives to be tested.

10. The test device of claim 8, wherein the first port is an M.2 slot, the second port is a U.2 golden finger, and the test port is a U.2 slot.

11. The test device of claim 8, wherein the adapter box further comprises a fool-proof structure including a first component located at the box body and a second component located at the one of the test adapter plates, the first component being matched with the second component, and the box body is mounted to the one of the test adapter plates in a predetermined direction.

12. The test device of claim 1, wherein the adapter box is disposed as a hollowed-out structure.

13. The test device of claim 1, wherein the test device further comprises a processor communicatively connected with the test port, the processor being configured to control scanning processing of the multiple Solid State Drives to be tested.

14. The test device of claim 1, wherein
the second positioning portion is configured to move relative to the first positioning portion to be received by the first positioning portion to arrange an adapter plate of the adapter box in a testing position with respect to the test port of the test plate; and
the first positioning portion comprises a slide groove, and the second positioning portion comprises a slide rail for being slidably connected with the slide groove, the slide rail comprising positioning fulcrums disposed along a sliding direction of the slide rail and slidably connected with the slide groove.

15. A test machine, comprising:
a test device, comprising:
- a test plate, comprising:
  - a test port; and
  - a first positioning portion disposed on the test plate; and
- an adapter box, comprising:
  - a box body comprising mounting grooves configured to detachably mount multiple Solid State Drives to be tested along the mounting grooves; and
  - a second positioning portion disposed on and connected to the box body,
wherein:
  the first positioning portion is configured to receive the second positioning portion, which is separate from the first positioning portion, to combine the adapter box that carries the multiple Solid State Drives to be tested with the test plate; and
  a relative position between the test port and the box body is adjusted by engagement of the first positioning portion with a locking assembly rotatably connected with the first positioning portion, to cause the multiple Solid State Drives to be tested in the box body to form a communication connection with the test port;
a processor communicatively connected with the test port of the test device; and
a memory communicatively connected with the processor, and storing computer-executable instructions which, when executed by the processor, scan the multiple Solid State Drives to be tested through the test port.

16. The test machine of claim 15, wherein the computer-executable instructions are further executed by the processor to store data of the multiple Solid State Drives to be tested obtained by scanning processing as a data set.

17. The test machine of claim 16, wherein the computer-executable instructions are further executed by the processor to determine whether the multiple Solid State Drives are qualified according to the data set.

18. A test method, comprising:
mounting multiple Solid State Drives to be tested using a test device, wherein the test device comprises:
- a test plate, comprising:
  - a test port; and
  - a first positioning portion disposed on the test plate; and
- an adapter box, comprising:

a box body comprising mounting grooves configured to detachably mount the multiple Solid State Drives to be tested along the mounting grooves; and a second positioning portion disposed on and connected to the box body, wherein:

the first positioning portion is configured to receive the second positioning portion, which is separate from the first positioning portion, to combine the adapter box that carries the multiple Solid State Drives to be tested with the test plate; and a relative position between the test port and the box body is adjusted by engagement of the first positioning portion with a locking assembly rotatably connected with the first positioning portion, to cause the multiple Solid State Drives to be tested in the box body to form a communication connection with the test port; and scanning the multiple Solid State Drives to be tested.

19. The test method of claim 18, further comprising:

storing data of the multiple Solid State Drives to be tested as a data set.

20. The test method of claim 19, further comprising:

determining whether the multiple Solid State Drives are qualified according to the data set.

\* \* \* \* \*